US012635029B2

(12) United States Patent
Addepalli

(10) Patent No.: US 12,635,029 B2
(45) Date of Patent: May 19, 2026

(54) EFFICIENT SEARCH OF UE CONTEXT DURING BASE STATION RESUME PROCEDURE

(71) Applicant: Rakuten Symphony, Inc., Tokyo (JP)

(72) Inventor: Kiran Kumar Addepalli, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 313 days.

(21) Appl. No.: 18/580,612

(22) PCT Filed: Dec. 11, 2023

(86) PCT No.: PCT/US2023/083272
§ 371 (c)(1),
(2) Date: Jan. 19, 2024

(87) PCT Pub. No.: WO2025/090102
PCT Pub. Date: May 1, 2025

(65) Prior Publication Data
US 2025/0240845 A1      Jul. 24, 2025

(30) Foreign Application Priority Data

Oct. 26, 2023      (IN) .............................. 202341073012

(51) Int. Cl.
*H04W 76/27*          (2018.01)
*H04W 12/06*          (2021.01)
*H04W 48/16*          (2009.01)

(52) U.S. Cl.
CPC ........... *H04W 76/27* (2018.02); *H04W 12/06* (2013.01); *H04W 48/16* (2013.01)

(58) Field of Classification Search
CPC ..... H04W 12/06; H04W 76/27; H04W 48/16; H04W 76/19; H04W 76/11; H04W 36/0033; H04W 12/73; H04W 12/72
See application file for complete search history.

(56) References Cited

U.S. PATENT DOCUMENTS 10,869,352 B2 *    12/2020    Gao ....................... H04W 36/00
11,627,623 B2 *     4/2023    Hu ......................... H04W 12/04
                                                                    455/411
2019/0045570 A1     2/2019    Lu et al.
2021/0126747 A1     4/2021    Kim et al.

FOREIGN PATENT DOCUMENTS

KR          1020180112814  A      10/2018

* cited by examiner

*Primary Examiner* — Muhammad N Edun
(74) *Attorney, Agent, or Firm* — HAUPTMAN HAM, LLP

(57) ABSTRACT

The present disclosure describes a method and a base station for efficient searching of UE context during base station resume procedure. The base station receives a resume request from a UE. The resume request comprises a base station identifier, a UE identifier, and authentication information. Subsequently, the base station retrieves a RAT information of the UE from a lower layer of the base station upon receiving the resume request. Based on at least one of the base station identifier, the UE identifier, the authentication information, and the RAT information, the base station either receives a UE context information from one of a plurality of neighbouring base stations or determines the UE context information at the base station. Thereafter, the base station establishes a connection with the UE using the UE context information.

12 Claims, 3 Drawing Sheets

EFFICIENT SEARCH OF UE CONTEXT DURING BASE STATION RESUME PROCEDURE

RELATED APPLICATIONS

The present application is a National Phase of International Application No. PCT/US2023/083272, filed Dec. 11, 2023, which claims priority based on Indian Patent Application number 202341073012, filed Oct. 26, 2023.

TECHNICAL FIELD

The present disclosure relates to efficient searching of UE context during base station resume procedure.

BACKGROUND

In telecommunication, when a User Equipment (UE) enters a suspended state, a base station to which the UE was connected prior to suspension provides an identifier (full or truncated) on suspension to be stored in the UE, and the base station. The identifier is generated by the base station and provided to the UE. The identifier is stored in both the UE and the base station. The base station may provide the identifier in a Full Resume Id (that is 40 bits) or a Truncated Resume Id (that is 24 bits). During a resume procedure, the UE provides either the Full Resume Id or the Truncated Resume Id to a base station it wants to establish connection. In the present state of the art, the Full Resume Id or the Truncated Resume Id may include Radio Access Technology (RAT) information so that the base station (to which the UE was connected prior to suspension) can perform the search only in the set of suspended contexts corresponding to that RAT. The bits available in the Full Resume Id or the Truncated Resume Id are very limited and hence, can be used for purposes of efficient search of suspended UE context. However, in the absence of RAT information in the Full Resume Id or the Truncated Resume Id may result in significant time consumption at the base station to search the UE context, resulting in delay in resumption of services between the base station and the UE.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a base station comprising a processor and a memory communicatively coupled to the processor, wherein the memory stores processor-executable instructions, which on execution, cause the processor to receive a resume request from a UE. The resume request comprises a base station identifier, a UE identifier, and authentication information. Subsequently, the base station is configured to retrieve a Radio Access Technology (RAT) information of the UE from a lower layer of the base station upon receiving the resume request. Thereafter, the base station is configured to determine whether the received base station identifier from the UE matches with the base station identifier of the base station. When the received base station identifier from the UE does not match with the base station identifier of the base station, the base station is configured to transmit at least one of the received base station identifier, the received UE identifier, the received authentication information, and the RAT information to a plurality of neighbouring base stations and receive a UE context information from one of the plurality of neighbouring base stations. When the received base station identifier from the UE matches with the base station identifier of the base station, the base station is configured to determine whether the received UE identifier and the RAT information match with an information in a UE context database of the base station and determine the UE context information when the received UE identifier and the RAT information match with the information in the UE context database of the base station. Lastly, the base station is configured to establish a connection with the UE using the UE context information.

In an embodiment, the present disclosure relates to a method. The method comprising receiving a resume request from a UE. The resume request comprises a base station identifier, a UE identifier, and authentication information. Subsequently, the method comprising retrieving a Radio Access Technology (RAT) information of the UE from a lower layer of the base station upon receiving the resume request. Thereafter, the method comprising determining whether the received base station identifier from the UE matches with the base station identifier of the base station. When the received base station identifier from the UE does not match with the base station identifier of the base station, the method comprising transmitting at least one of the received base station identifier, the received UE identifier, the received authentication information, and the RAT information to a plurality of neighbouring base stations and receiving a UE context information from one of the plurality of neighbouring base stations. When the received base station identifier from the UE matches with the base station identifier of the base station, the method comprising determining whether the received UE identifier and the RAT information match with an information in a UE context database of the base station and determining the UE context information when the received UE identifier and the RAT information match with the information in the UE context database of the base station. Lastly, the method comprising establishing a connection with the UE using the UE context information.

In an embodiment, the present disclosure relates to a non-transitory computer readable medium including instructions stored thereon that when processed by at least one processor cause a base station to perform operations comprising receiving a resume request from a UE. The resume request comprises a base station identifier, a UE identifier, and authentication information. Subsequently, the instructions cause the at least one processor to retrieve a Radio Access Technology (RAT) information of the UE from a lower layer of the base station upon receiving the resume request. Thereafter, the instructions cause the at least one processor to determine whether the received base station identifier from the UE matches with the base station identifier of the base station. When the received base station identifier from the UE does not match with the base station identifier of the base station, the instructions cause the at least one processor to transmit at least one of the received base station identifier, the received UE identifier, the received authentication information, and the RAT information to a plurality of neighbouring base stations and receive a UE context information from one of the plurality of neighbouring base stations. When the received base station identifier from the UE matches with the base station identifier of the base station, the instructions cause the at least one processor to determine whether the received UE identifier and the RAT information match with an information in a UE context database of the base station and determine the UE context information when the received UE identifier and the RAT information match with the information in the UE context database of the base station. Lastly, the instructions cause the at least one processor to establish a connection with the UE using the UE context information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate embodiments and together with the description, serve to explain the disclosed principles. In the figures, the left-most digit(s) of a reference number identifies the figure in which the reference number first appears. The same numbers are used throughout the figures to reference like features and components. Some embodiments of system and methods in accordance with embodiments of the present subject matter are now described below, by way of example only, and with reference to the accompanying figures.

Figure 1:
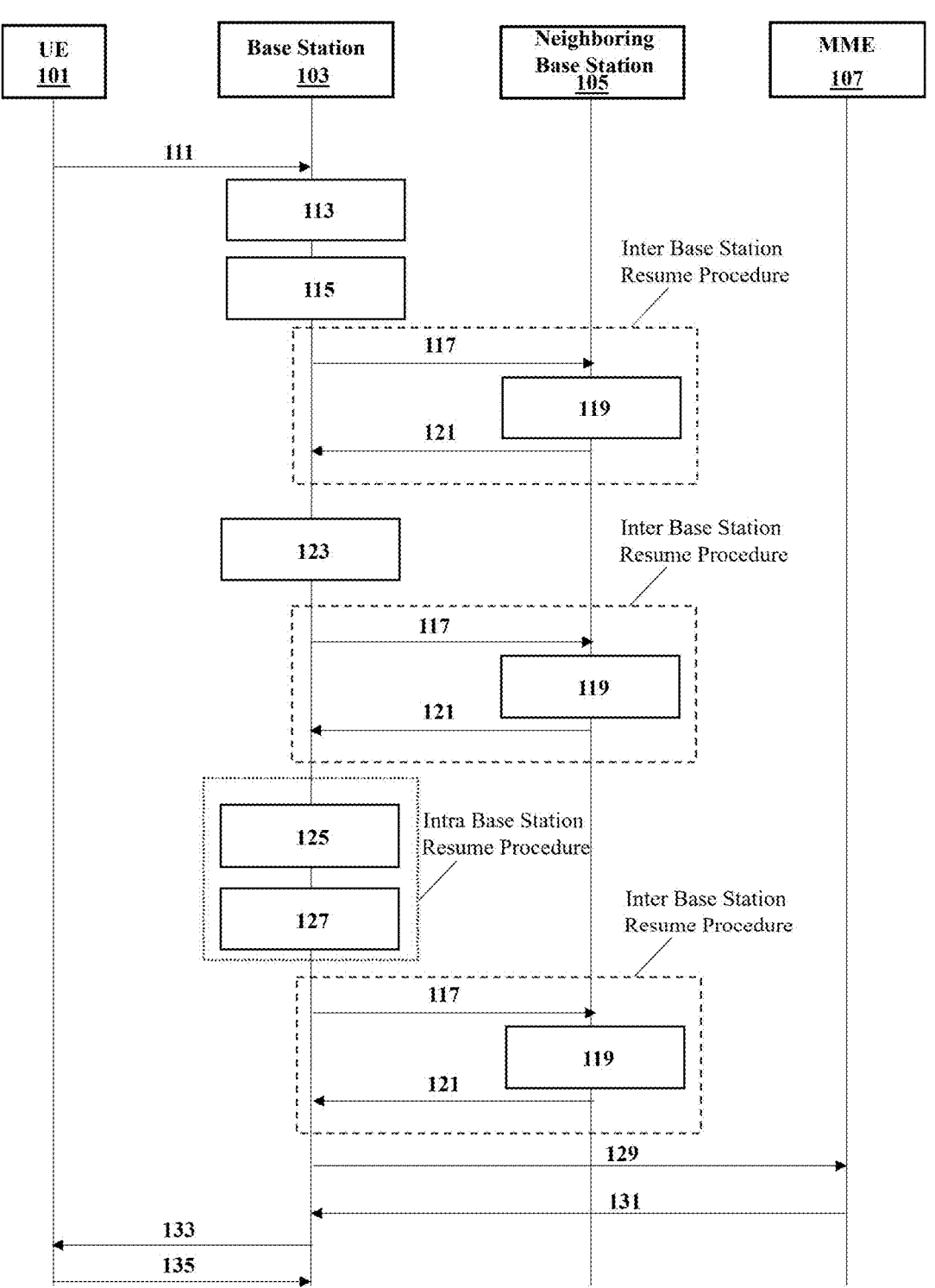
FIG. 1 illustrates a flow diagram for efficient searching of UE context during base station resume procedure in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

TABLE 1

| Abbreviation | Description |
| --- | --- |
| UE | User equipment |
| 6G | Sixth Generation cellular network technology |
| 4G | Fourth Generation cellular network technology |
| 5G | Fifth Generation cellular network technology |
| MME | Mobility Management Entity |
| RAT | Radio Access Technology |
| RRC | Radio Resource Control |
| I-RNTI | Inactive Radio Network Temporary Identifier |
| MAC-I | Message Authentication Code-Integrity |
| URLLC | Ultra-Reliable Low Latency Communication |
| NB-IoT | Narrowband Internet of Things |
| LTE-M or LTE-MTC | LTE Machine Type Communication |
| PLMN | Public Land Mobile Network |
| MO | Mobile Originated |
| MT | Mobile Terminated |
| EDT | Early Data Transmission |
| EPS | Evolved Packet System |
| PUR | Preconfigured Uplink Transmission |
| CLoT | Cellular Internet of Things or Mobile Internet of Things |
| PDCP | Packet Data Convergence Protocol |
| SDAP | Service Data Adaptation Protocol |
| RLC | Radio Link Control |
| MAC | Medium Access Control |
| I-O interface | Input-Output interface |
| CDMA | Code-Division Multiple Access |
| HSPA+ | High-Speed Packet Access |
| GSM | Global System for Mobile communications |
| LTE | Long-Term Evolution |
| WiMax | Worldwide interoperability for Microwave access |
| RAID | Redundant Array of Independent Discs |
| ASIC | Application Specific Integrated Circuit |
| FPGA | Field-Programmable Gate Arrays |
| PGA | Programmable Gate Array |
| ASIC | Application Specific Integrated Circuit |
| RAM | Random Access Memory |
| ROM | Read-Only Memory |
| NR | New Radio |
| AMF | Access and Mobility Management Function |

FIG. 1 illustrates a flow diagram for efficient searching of UE context during base station resume procedure in accordance with some embodiments of the present disclosure.

With reference to FIG. 1, the environment comprises of a UE 101, a base station 103, a neighbouring base station 105 and an MME 107. The UE 101 may also be referred as a mobile terminal, a user terminal, a mobile device, an LTE UE, or a NR device. The base station 103 and the neighbouring base station 105 may also be referred as a node B, an evolved Node B (eNodeB or eNB), or next generation Node B (gNodeB or gNB or new serving gNB or ng-eNB).

The neighbouring base station 105 may be one or more neighbouring base stations. For sake of explanation, only one neighbouring base station 105 is shown in FIG. 1, which is not to be construed as limiting. The communication among the UE 101, the base station 103 and the neighbouring base station 105 may be using one of the RAT types, but not limited to, CDMA, GSM, LTE, WiMax, GSM, UMTS, 5G NR, LTE-M, NB-IoT, URLLC, and the like. In an embodiment, the UE may be a NR device and the base station 103 and the neighbouring base station 105 may be gNB. In an embodiment, the UE may be an LTE device and the base station 103 and the neighbouring base station 105 may be ng-eNB.

Prior to receiving a resume request from the UE 101 by the base station 103, when the UE 101 enters a suspended state, the base station 103 to which the UE 101 was connected prior to suspension provides a UE context (also, referred as UE context information) on suspension to be stored in the UE 101 during RRC Release (in case of the base station 103 being gNB) or RRC Connection Release (in case of the base station 103 being ng-eNB), and in the MME 107 (in case of the base station 103 being gNB or ng-eNB) or in an AMF (not shown in FIG. 1, in case the base station 103 being gNB). The base station 103 may provide the UE context in a Full Resume Id (that is 40 bits) or a Truncated Resume Id (that is 24 bits) during the during RRC Release or RRC Connection Release.

The operation for efficient searching of UE context during base station resume procedure is explained with reference to FIG. 1. For sake of explanation, the below operation is explained considering the base station 103 to be gNB or ng-eNB, the UE 101 to be NR device and MME 107.

In operation 111, the base station 103 receives a resume request from the UE 101. The resume request may be one of RRC Resume Request (with short I-RNTI in case of the base station 103 being gNB) or RRC Resume Request1 (with I-RNTI in case of the base station 103 being gNB) or RRC Connection Resume Request (with short I-RNTI or I-RNTI in case of the base station 103 being ng-eNB). The resume request is received with one of a full resume identity (also, referred as Full Resume Id, or I-RNTI) or a truncated resume identity (also, referred as Truncated Resume Id, or short I-RNTI). The resume request comprises a base station identifier, a UE identifier, and authentication information. The base station identifier may, also, be referred as eNB ID or gNB ID. The base station identifier comprises information to identify the base station where suspension of the UE 101 happened. The UE identifier may, also, be referred as UE Specific Reference or UE ID. The UE identifier comprises information to identify the UE context with the base station where suspension of the UE 101 happened. The authentication information may, also, be referred as ShortResume-MAC-I or ShortMAC-I, which is used during integrity verification of the UE 101. In an embodiment, a full resume identity or a truncated resume identity may be composed of information pertaining to the base station identifier, the UE identifier, PLMN, and RAT that will enable a base station identify the suspended UE context.

In operation 113, the base station 103 retrieves a RAT information of the UE 101 from a lower layer of the base station 103 upon receiving the resume request in operation 111. The lower layers of the base station 103 refers to protocol layers below RRC in a protocol stack, for example, PDCP, RLC, and MAC. The RAT information comprises a RAT type (also, referred as service type) of the UE 101. The RAT type includes, but not limited to, CDMA, GSM, LTE, WiMax, GSM, UMTS, 5G NR, LTEM, NB-IoT, and URLLC. In an embodiment, when the resume request is received by lower layers in operation 111, the lower layers of the base station 103 determine the RAT information and pass the resume request and the RAT information to an upper layer i.e., RRC.

In operation 115, the base station 103 determines whether the received base station identifier from the UE 101 matches with the base station identifier of the base station 103.

When the received base station identifier from the UE 101 does not match with the base station identifier of the base station 103, steps 117, 119, and 121 are performed. The steps 117, 119, and 121 may be referred as inter-base station resume procedure.

In operation 117, the base station 103 transmits at least one of the received base station identifier, the received UE identifier, the received authentication information, and the RAT information to the neighbouring base station 105. The base station 103 transmits RAT information separately as an additional input along with at least one of the received base station identifier, the received UE identifier, the received authentication information and not in the Full Resume Id or the Truncated Resume Id to the neighbouring base station 105. The base station 103 transmits at least one of the received base station identifier, the received UE identifier, the received authentication information, and the RAT information to the neighbouring base station 105 in Retrieve UE Context Request. This approach allows better utilization of very limited bits available in the Full Resume Id or the Truncated Resume Id for purposes of representing base station identifier, or UE identifier other than search of suspended UE context or other information that can aid the search of suspended UE context. Further, the transmission of the RAT information to the neighbouring base station 105 for receiving a UE context information reduces computation time required for searching of UE context at the neighbouring base station 105 significantly, leading to quick resumption of services (or resume procedure) between the base station 103 and the UE 101. In an embodiment, the base station 103 selects the neighbouring base station 105 by matching the base station identifier received from the UE 101 with base station identifiers stored in the base station 103. In this case, the base station 103 stores the base station identifiers of neighbouring base stations in its memory.

In operation 119, the neighbouring base station 105 determines whether the received base station identifier from the base station 103 matches with the base station identifier of the neighbouring base station 105. When the received base station identifier from the base station 103 matches with the base station identifier of the neighbouring base station 105, the neighbouring base station 105 determines whether the received UE identifier and the RAT information match with an information in a UE context database of the neighbouring base station 105. In an embodiment, the neighbouring base station 105 may maintain separate subsets of UE context for different RAT types such as LTEM, NB-IoT, URLLC, and the like. This approach allows faster and easy searching of UE context from a smaller subset. When the received UE identifier and the RAT information match with the information in the UE context database of the neighbouring base station 105, the neighbouring base station 105, determines the UE context information. In detail, the neighbouring base station 105 verifies whether the received authentication information from the UE 101 matches with a UE authentication information computed at the neighbouring base station 105. This step may, also, be referred as integrity verification step of the UE 101. The neighbouring base station 105 determines the UE context information, when the received authentication information from the UE 101 matches with the UE authentication information computed at the neighbouring base station 105. In a situation where any of the above condition fails or does not match, the neighbouring base station 105 sends a negative response to the base station 103 in Retrieve UE Context Failure (not shown in FIG. 1) or stops the process to determine the UE context information.

In operation 121, the base station 103 receives the UE context information from the neighbouring base station 105. The base station 103 receives the UE context information from the neighbouring base station 105 in Retrieve UE Context Response. The UE context information comprises a UE context related to the suspended connection of the UE with the neighbouring base station 105.

In operation 123, the base station 103 determines whether the received UE identifier and the RAT information match with an information in a UE context database of the base station 103 when the received base station identifier from the UE 101 matches with the base station identifier of the base station 103. In an embodiment, the base station 103 may maintain separate subsets of UE context for different RAT types such as LTEM, NB-IoT, URLLC, and the like. This approach allows faster and easy searching of UE context from a smaller subset.

When the received UE identifier and the RAT information does not match with the information in the UE context database of the base station 103, the steps 117, 119, and 121 (described above) are performed. The steps 117, 119, and 121 may be referred as inter-base station resume procedure.

In operation 117, the base station 103 transmits at least one of the received base station identifier, the received UE identifier, the received authentication information, and the RAT information to the neighbouring base station 105. The base station 103 transmits RAT information separately as an additional input along with at least one of the received base station identifier, the received UE identifier, the received authentication information and not in the Full Resume Id or the Truncated Resume Id to the neighbouring base station 105. The base station 103 transmits at least one of the received base station identifier, the received UE identifier, the received authentication information, and the RAT information to the neighbouring base station 105 in Retrieve UE Context Request or X2AP Retrieve UE Context Request or XnAP Retrieve UE Context Request. This approach allows better utilization of very limited bits available in the Full Resume Id or the Truncated Resume Id for purposes other than search of suspended UE context. Further, the transmission of the RAT information to the neighbouring base station 105 for receiving a UE context information reduces computation time required for searching of UE context at the neighbouring base station 105 significantly, leading to quick resumption of services (or resume procedure) between the base station 103 and the UE 101.

In operation 119, the neighbouring base station 105 determines whether the received base station identifier from the base station 103 matches with the base station identifier of the neighbouring base station 105. When the received base station identifier from the base station 103 matches with the base station identifier of the neighbouring base station 105, the neighbouring base station 105 determines whether the received UE identifier and the RAT information match with an information in a UE context database of the neighbouring base station 105. In an embodiment, the neighbouring base station 105 may maintain separate subsets of UE context for different RAT types such as LTEM, NB-IoT, URLLC, and the like. This approach allows faster and easy searching of UE context from a smaller subset. When the received UE identifier and the RAT information match with the information in the UE context database of the neighbouring base station 105, the neighbouring base station 105, determines the UE context information. In detail, the neighbouring base station 105 verifies whether the received authentication information from the UE 101 matches with a UE authentication information computed at the neighbouring base station 105. This step may, also, be referred as integrity verification step of the UE 101. The neighbouring base station 105 determines the UE context information, when the received authentication information from the UE 101 matches with the UE authentication information computed at the neighbouring base station 105. In a situation where any of the above condition fails or does not match, the neighbouring base station 105 sends a negative response to the base station 103 in Retrieve UE Context Failure (not shown in FIG. 1) or stops the process to determine the UE context information.

In operation 121, the base station 103 receives the UE context information from the neighbouring base station 105. The base station 103 receives the UE context information from the neighbouring base station 105 in Retrieve UE Context Response. The UE context information comprises a UE context related to the suspended connection of the UE with the neighbouring base station 105.

When the received UE identifier and the RAT information match with the information in any or multiple suspended UE contexts in a database of the base station 103 (also, referred as UE context database), steps 125, and 127 are performed. The steps 125, and 127 may be referred as intra-base station resume procedure.

In operation 125, the base station 103 verifies whether the received authentication information from the UE 101 matches with a UE authentication information computed at the base station 103. This step may, also, be referred as integrity verification step of the UE 101.

In operation 127, the base station 103 determines the UE context information, when the received authentication information from the UE 101 matches with the UE authentication information computed at the base station 103. The UE context information comprises a UE context related to the suspended connection of the UE with the base station 103.

When the received authentication information from the UE 101 does not matches with the UE authentication information computed at the base station 103, the steps 117, 119, and 121 (described above) are performed. The steps 117, 119, and 121 may be referred as inter-base station resume procedure.

In operation 117, the base station 103 transmits at least one of the received base station identifier, the received UE identifier, the received authentication information, and the RAT information to the neighbouring base station 105. The base station 103 transmits RAT information separately as an additional input along with at least one of the received base station identifier, the received UE identifier, the received authentication information and not in the Full Resume Id or the Truncated Resume Id to the neighbouring base station 105. The base station 103 transmits at least one of the received base station identifier, the received UE identifier, the received authentication information, and the RAT information to the neighbouring base station 105 in Retrieve UE Context Request. This approach allows better utilization of very limited bits available in the Full Resume Id or the Truncated Resume Id for purposes other than search of suspended UE context. Further, the transmission of the RAT information to the neighbouring base station 105 for receiving a UE context information reduces computation time required for searching of UE context at the neighbouring base station 105 significantly, leading to quick resumption of services (or resume procedure) between the base station 103 and the UE 101.

In operation 119, the neighbouring base station 105 determines whether the received base station identifier from the base station 103 matches with the base station identifier of the neighbouring base station 105. When the received base station identifier from the base station 103 matches with the base station identifier of the neighbouring base station 105, the neighbouring base station 105 determines whether the received UE identifier and the RAT information match with an information in a UE context database of the neighbouring base station 105. In an embodiment, the neighbouring base station 105 may maintain separate subsets of UE context for different RAT types such as LTEM, NB-IoT, URLLC, and the like. This approach allows faster and easy searching of UE context from a smaller subset. When the received UE identifier and the RAT information match with the information in the UE context database of the neighbouring base station 105, the neighbouring base station 105, determines the UE context information. In detail, the neighbouring base station 105 verifies whether the received authentication information from the UE 101 matches with a UE authentication information computed at the neighbouring base station 105. This step may, also, be referred as integrity verification step of the UE 101. The neighbouring base station 105 determines the UE context information, when the received authentication information from the UE 101 matches with the UE authentication information computed at the neighbouring base station 105. In a situation where any of the above condition fails or does not match, the neighbouring base station 105 sends a negative response to the base station 103 in Retrieve UE Context Failure (not shown in FIG. 1) or stops the process to determine the UE context information.

In operation 121, the base station 103 receives the UE context information from the neighbouring base station 105. The base station 103 receives the UE context information from the neighbouring base station 105 in Retrieve UE Context Response. The UE context information comprises a UE context related to the suspended connection of the UE with the neighbouring base station 105.

In operation 129, the base station 103 transmits a UE context resume request to the MME 107.

In operation 131, the base station 103 receives a UE context resume response from the MME 107 in response to the UE context resume request.

In operation 133, the base station 103 transmits a connection resume to the UE 101 upon receiving the UE context resume response from the MME 107. The connection resume may be one of RRC Resume (in case of the base station 103 being gNB) or RRC Connection Resume (in case of the base station 103 being ng-eNB).

In operation 135, the base station 103 receives a connection resume complete from the UE 101 in response to the connection resume request. Thereafter, the UE 101 is connected to the base station 103. The steps 129, 131, 133, and 135 together may refer to establishing a connection with the UE 101 using the UE context information. The connection resume complete may, be one of RRC Resume Complete (in case of the base station 103 being gNB) or RRC Connection Resume Complete (in case of the base station 103 being ng-eNB).

The above-mentioned operation performed by the base station 103 for intra-base station resume procedure and inter-base station resume procedure is, also, applicable for the neighbouring base station 105 when a resume request from the UE 101 is received by the neighbouring base station 105 (instead of the base station 103).

The above-mentioned operation performed by the base station 103 for intra-base station resume procedure and inter-base station resume procedure is, also, applicable for situations involving MO-EDT for User Plane CIoT EPS or 5GS optimisations, MT-EDT for User Plane CIoT EPS optimisation, and transmission using PUR for User Plane CIoT EPS or 5GS optimisations.

The above-mentioned operation performed by the base station 103, the UE 101 and the MME 107 is same when the base station 103 is an eNB, the UE 101 is an LTE UE device and MME 107 is an AMF. For sake of brevity, their operation for efficient searching of UE context during base station resume procedure is omitted.

The above-mentioned operation performed by the base station 103 for efficient searching of UE context during base station resume procedure is applicable to, but not limited to, 4G, 5G and 6G telecommunication networks.

Figure 2:
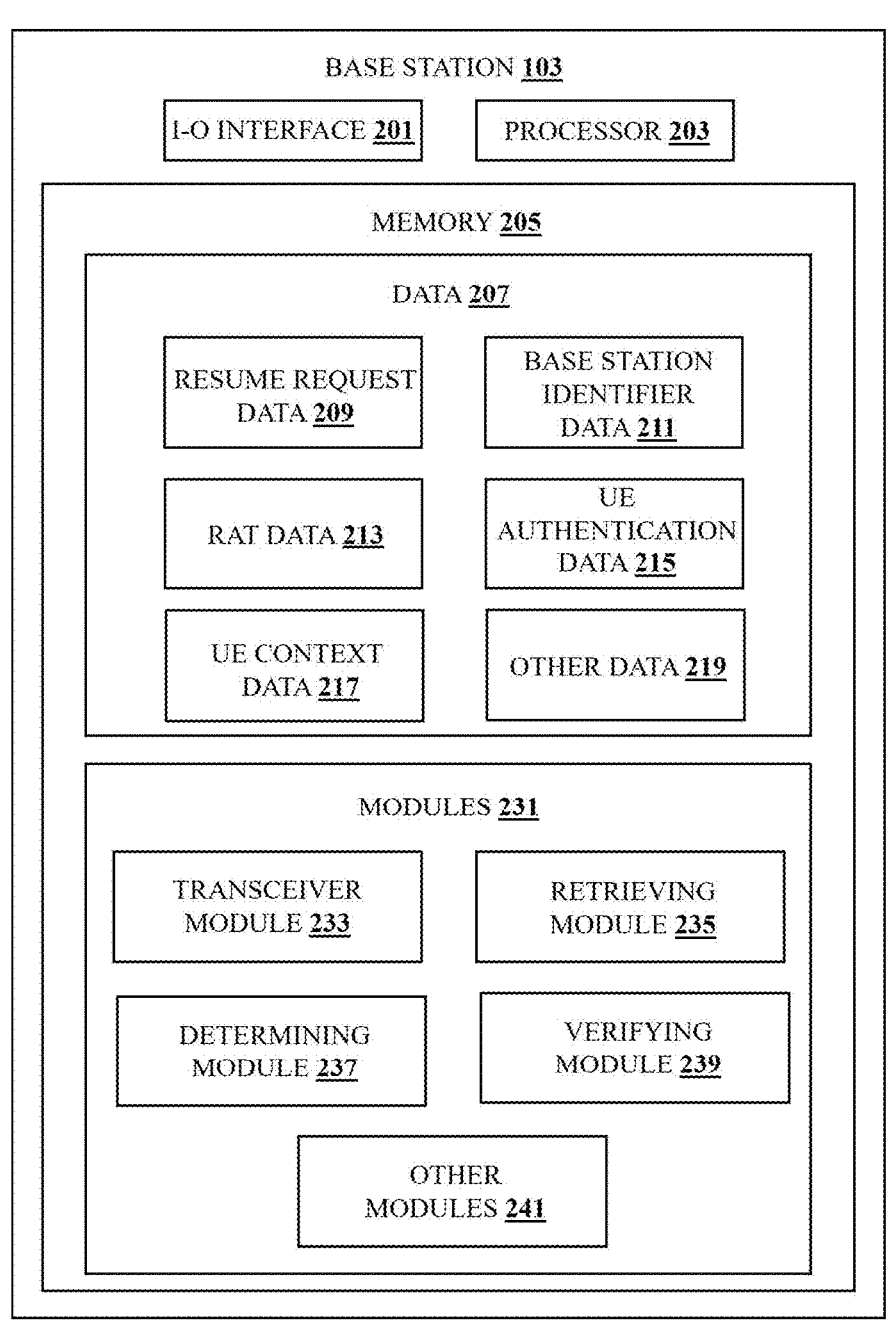
FIG. 2 shows a detailed block diagram of a base station in accordance with some embodiments of the present disclosure.

FIG. 2 shows a detailed block diagram of a base station 103 in accordance with some embodiments of the present disclosure.

The base station 103 may include an I-O) interface 201, a processor 203, data 207 and one or more modules 231 (also, referred as modules), which are described herein in detail.

The base station 103 may communicate with the UE 101, the neighbouring base station 105 and the MME 107 via the I-O interface 201. The I-O interface 201 may employ communication protocols or methods such as, without limitation, Bluetooth, cellular e.g., CDMA, HSPA+, GSM, LTE, NR, WiMax, or the like.

The processor 203 may include at least one data processor for searching of UE context during base station resume procedure. The processor 203 may include specialized processing units such as, without limitation, integrated system (bus) controllers, memory management control units, floating point units, graphics processing units, digital signal processing units, etc.

In an embodiment, the data 207 may be stored within the memory 205. The memory 205 may be communicatively coupled to the processor 203 of the base station 103. The memory 205 may, also, store processor instructions which may cause the processor 203 to execute the instructions for searching of UE context during base station resume procedure. The memory 205 may include, without limitation, memory drives, etc. The memory drives may further include a drum, magnetic disc drive, magneto-optical drive, optical drive, RAID, solid-state memory devices, solid-state drives, etc.

The data 207 may include, for example, resume request data 209, base station identifier data 211, RAT data 213, UE authentication data 215, UE context data 217, and other data 219.

The resume request data 209 may store a base station identifier, a UE identifier, and authentication information of a resume request received from the UE 101.

The base station identifier data 211 may store the base station identifier of the base station 103.

The RAT data 213 store a RAT information of the UE 101 retrieves from a lower layer of the base station 103. The RAT information comprises a RAT type of the UE 101. The RAT type includes, but not limited to, CDMA, GSM, LTE, WiMax, GSM, UMTS, 5G NR, LTEM, NBIoT, and URLLC.

The UE authentication data 215 may store a UE authentication information computed at the base station 103.

The UE context data 217 may store a UE context related to the connection of the UE 101 with the base station 103. The UE context data 217 may also be referred as a UE context database of the base station 103. In an embodiment, the UE context data 217 may store UE context related to the connection of other UEs with the base station 103.

The other data 219 may store data, including temporary data and temporary files, generated by one or more modules 231 for performing the various functions of the base station 103.

In an embodiment, the data 207 in the memory 205 are processed by the one or more modules 231 present within the memory 205 of the base station 103. The one or more modules 231 may be implemented as dedicated hardware units. As used herein, the term module refers to an ASIC, an electronic circuit, a FPGA, a combinational logic circuit, and other suitable components that provide the described functionality. In some implementations, the one or more modules 231 may be communicatively coupled to the processor 203 for performing one or more functions of the base station 103. The one or more modules 231 when configured with the functionality defined in the present disclosure will result in a novel hardware.

In one implementation, the one or more modules 231 may include, but are not limited to, a transceiver module 233, a retrieving module 235, a determining module 237, and a verifying module 239. The one or more modules 231 may, also, include other modules 241 to perform various miscellaneous functionalities of the base station 103.

Transceiver Module 233:

The transceiver module 233 receives a resume request, in operation 111, from the UE 101. The resume request comprises a base station identifier, a UE identifier, and authentication information.

When the received base station identifier from the UE 101 does not match with the base station identifier of the base station 103, the transceiver module 233 transmits at least one of the received base station identifier, the received UE identifier, the received authentication information, and the RAT information to a plurality of neighbouring base stations 105 and receives a UE context information from one of the plurality of neighbouring base stations 105.

When the received base station identifier from the UE 101 matches with the base station identifier of the base station 103 but the received UE identifier and the RAT information does not match with the information in the UE context database of the base station 103, the transceiver module 233 transmits at least one of the received base station identifier, the received UE identifier, the received authentication information, and the RAT information to a plurality of neighbouring base stations 105 and receives a UE context information from one of the plurality of neighbouring base stations 105.

When the received authentication information from the UE 101 does not match with the UE authentication information computed at the base station 103, the transceiver module 233 transmits at least one of the received base station identifier, the received UE identifier, the received authentication information, and the RAT information to the plurality of neighbouring base stations 105 and receives the UE context information from one of the plurality of neighbouring base stations 105.

The transceiver module 233 establishes a connection with the UE 101 using the UE context information.

Retrieving Module 235:

Upon receiving the resume request, the retrieving module 235 retrieves a RAT information of the UE 101 from a lower layer of the base station 103. The RAT information comprises a RAT type (also, referred as service type) of the UE 101. The RAT type includes, but not limited to, CDMA, GSM, LTE, WiMax, GSM, UMTS, 5G NR, LTEM, NBIoT, and URLLC. In an embodiment, when the resume request is received by lower layers in operation 111, the retrieving module 235 retrieves the RAT information and pass the resume request and the RAT information to an upper layer i.e., RRC.

Determining Module 237:

The determining module 237 determines whether the received base station identifier from the UE 101 matches with the base station identifier of the base station 103.

When the received base station identifier from the UE 101 matches with the base station identifier of the base station 103, the determining module 237 determines whether the received UE identifier and the RAT information match with an information in a UE context database of the base station 103. In an embodiment, the base station 103 may maintain separate subsets of UE context for different RAT types such as LTEM, NB-IoT, URLLC, and the like.

When the received UE identifier and the RAT information match with the information in the UE context database of the base station 103, the determining module 237 determines the UE context information. In detail, when the received UE identifier and the RAT information match with the information in the UE context database of the base station and when the received authentication information from the UE 101 matches with the UE authentication information computed at the base station 103, the determining module 237 determining the UE context information i.e., once the authentication is successful for the received authentication information, the determining module 237 determines the UE context information.

When the received authentication information from the UE 101 matches with the UE authentication information computed at the base station 103, the determining module 237 determines the UE context information i.e., once the authentication is successful for the received authentication information, the determining module 237 determines the UE context information.

Verifying Module 239:

While determining the UE context information when the received UE identifier and the RAT information match with the information in the UE context database of the base station 103, the verifying module 239 verifies whether the received authentication information from the UE 101 matches with a UE authentication information computed at the base station 103. For instance, while determining the UE context information when the received UE identifier and the RAT information match with the information in the UE context database of the base station 103, the verifying module 239 verifies whether the received ShortResume-MAC-I or ShortMAC-I from the UE 101 matches with a ShortResumeMAC-I or ShortMAC-I computed at the base station 103.

The above-mentioned block diagram for the base station 103 is, also, applicable for the neighbouring base station 105.

Figure 3:
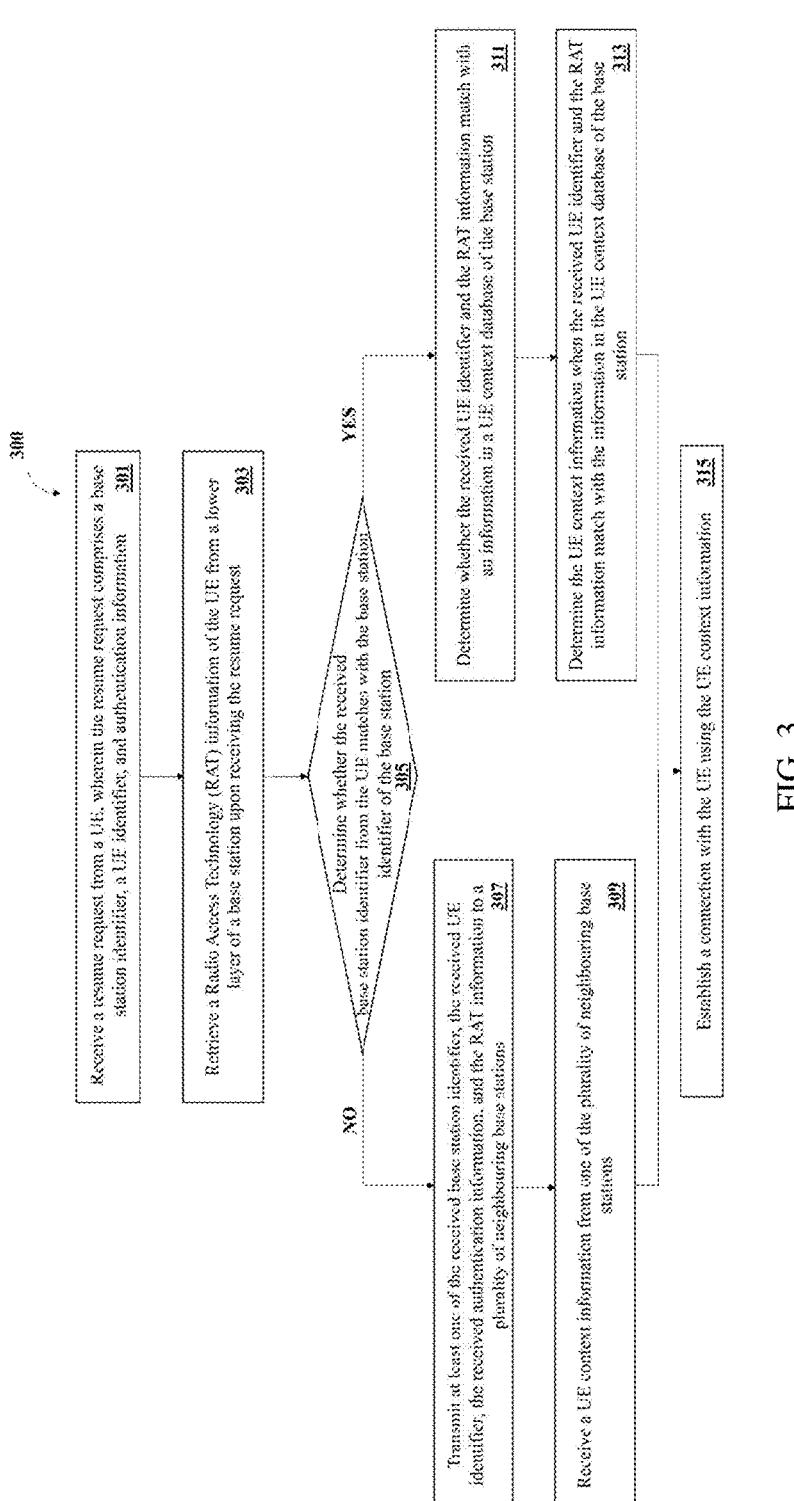
FIG. 3 illustrates a flowchart showing a method for efficient searching of UE context during base station resume procedure in accordance with some embodiments of the present disclosure.

FIG. 3 is a flowchart illustrating an example method of performing certain techniques of this disclosure by a base station 103 of FIG. 2. This example method shows a method for efficient searching of UE context during base station resume procedure in accordance with some embodiments of the present disclosure.

As illustrated in FIG. 3, the method 300 includes one or more blocks for efficient searching of UE context during base station resume procedure in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the transceiver module 233 of the base station 103 receives a resume request from the UE 101. The resume request comprises a base station identifier, a UE identifier, and authentication information. The resume request is received with one of a full resume identity (also, referred as Full Resume ID) or a truncated resume identity (also, referred as Truncated Resume ID).

At block 303, the retrieving module 235 of the base station 103 retrieves a RAT information of the UE 101 from a lower layer of the base station 103 upon receiving the resume request.

At block 305, the determining module 237 of the base station 103 determines whether the received base station identifier from the UE 101 matches with the base station identifier of the base station 103.

The following blocks are performed when the received base station identifier from the UE 101 does not match with the base station identifier of the base station 103.

At block 307, the transceiver module 233 of the base station 103 transmits at least one of the received base station identifier, the received UE identifier, the received authentication information, and the RAT information to the plurality of neighbouring base stations 105.

At block 309, the transceiver module 233 of the base station 103 receives a UE context information from one of the plurality of neighbouring base stations 105.

At block 315, the transceiver module 233 of the base station 103 establishes a connection with the UE 101 using the UE context information. The UE context information comprises a UE context related to the connection of the UE 101 with the base station 103 or one of the plurality of neighbouring base stations 105.

The following blocks are performed when the received base station identifier from the UE 101 matches with the base station identifier of the base station 103.

At block 311, the determining module 237 of the base station 103 determines whether the received UE identifier and the RAT information match with an information in a UE context database of the base station 103.

At block 313, when the received UE identifier and the RAT information match with the information in the UE context database of the base station 103, the determining module 237 of the base station 103 determines the UE context information. In detail, while determining the UE context information when the received UE identifier and the RAT information match with the information in the UE context database of the base station 103, the verifying module 239 of the base station 103 verifies whether the received authentication information from the UE 101 matches with a UE authentication information computed at the base station 103. When the received authentication information from the UE 101 matches with the UE authentication information computed at the base station 103, the determining module 237 of the base station 103 determines the UE context information. When the received authentication information from the UE 101 does not match with the UE authentication information computed at the base station 103, the transceiver module 233 of the base station 103 transmits at least one of the received base station identifier, the received UE identifier, the received authentication information, and the RAT information to the plurality of neighbouring base stations 105 and receives the UE context information from one of the plurality of neighbouring base stations 105.

At block 315, the transceiver module 233 of the base station 103 establishes a connection with the UE 101 using the UE context information. The UE context information comprises a UE context related to the connection of the UE 101 with the base station 103 or one of the plurality of neighbouring base stations 105.

Some of the technical advantages of the present disclosure are listed below.

The method of the present disclosure transmits RAT information separately and not in the Full Resume Id or the Truncated Resume Id to neighbouring base stations. This approach allows better utilization of very limited bits available in the Full Resume Id or the Truncated Resume Id for the purpose of containing additional information that can aid the search of suspended UE context information like additional base station identifier information or UE identifier information, PLMN information etc. For example, the resume identifier is not big enough to include the above-mentioned information.

The transmission of the RAT information to neighbouring base stations for receiving a UE context information reduces computation time required for searching of UE context at the neighbouring base stations significantly, leading to quick resumption of services (or resume procedure) between the base station and the UE.

Some of the clauses are mentioned below.

[1]: A base station comprising:

a processor; and a memory communicatively coupled to the processor, wherein the memory stores processor-executable instructions, which on execution, cause the processor to:

receive a resume request from a UE, wherein the resume request comprises a base station identifier, a UE identifier, and authentication information;

retrieve a Radio Access Technology (RAT) information of the UE from a lower layer of the base station upon receiving the resume request;

determine whether the received base station identifier from the UE matches with the base station identifier of the base station;

when the received base station identifier from the UE does not match with the base station identifier of the base station, transmit at least one of the received base station identifier, the received UE identifier, the received authentication information, and the RAT information to a plurality of neighbouring base stations;

receive a UE context information from one of the plurality of neighbouring base stations;

when the received base station identifier from the UE matches with the base station identifier of the base station, determine whether the received UE identifier and the RAT information match with an information in a UE context database of the base station;

determine the UE context information when the received UE identifier and the RAT information match with the information in the UE context database of the base station; and establish a connection with the UE using the UE context information.

[2]: The base station described in [1], while determining the UE context information when the received UE identifier and the RAT information match with the information in the UE context database of the base station, the base station is configured to:

verify whether the received authentication information from the UE matches with a UE authentication information computed at the base station;

when the received authentication information from the UE matches with the UE authentication information computed at the base station, determine the UE context information;

when the received authentication information from the UE does not match with the UE authentication information computed at the base station, transmit at least one of the received base station identifier, the received UE identifier, the received authentication information, and the RAT information to the plurality of neighbouring base stations; and receive the UE context information from one of the plurality of neighbouring base stations.

[3]: The base station described in any of [1] to [2], wherein the UE context information comprises a UE context related to the connection of the UE with the base station or one of the plurality of neighbouring base stations.

[4]: The base station described in any of [1] to [3], wherein the resume request is received with one of a full resume identity or a truncated resume identity.

[5]: A method comprising:

receiving a resume request from a UE, wherein the resume request comprises a base station identifier, a UE identifier, and authentication information;

retrieving a Radio Access Technology (RAT) information of the UE from a lower layer of a base station upon receiving the resume request;

determining whether the received base station identifier from the UE matches with the base station identifier of the base station;

when the received base station identifier from the UE does not match with the base station identifier of the base station, transmitting at least one of the received base station identifier, the received UE identifier, the received authentication information, and the RAT information to a plurality of neighbouring base stations;

receiving a UE context information from one of the plurality of neighbouring base stations;

when the received base station identifier from the UE matches with the base station identifier of the base station, determining whether the received UE identifier and the RAT information match with an information in a UE context database of the base station;

determining the UE context information when the received UE identifier and the RAT information match with the information in the UE context database of the base station; and establishing a connection with the UE using the UE context information.

[6]: The method described in [5], while determining the UE context information when the received UE identifier and the RAT information match with the information in the UE context database of the base station, the method comprising:

verifying whether the received authentication information from the UE matches with a UE authentication information computed at the base station;

when the received authentication information from the UE matches with the UE authentication information computed at the base station, determining the UE context information;

when the received authentication information from the UE does not match with the UE authentication information computed at the base station, transmitting at least one of the received base station identifier, the received UE identifier, the received authentication information, and the RAT information to the plurality of neighbouring base stations; and receiving the UE context information from one of the plurality of neighbouring base stations.

[7]: The method described in any of [5] to [6], wherein the UE context information comprises a UE context related to the connection of the UE with the base station or one of the plurality of neighbouring base stations.

[8]: The method described in any of [5] to [7], wherein the resume request is received with one of a full resume identity or a truncated resume identity.

[9]: A non-transitory computer readable medium including instructions stored thereon that when processed by at least one processor cause a base station to perform operations comprising:

receiving a resume request from a UE, wherein the resume request comprises a base station identifier, a UE identifier, and authentication information;

retrieving a Radio Access Technology (RAT) information of the UE from a lower layer of a base station upon receiving the resume request;

determining whether the received base station identifier from the UE matches with the base station identifier of the base station;

when the received base station identifier from the UE does not match with the base station identifier of the base station, transmitting at least one of the received base station identifier, the received UE identifier, the received authentication information, and the RAT information to a plurality of neighbouring base stations;

receiving a UE context information from one of the plurality of neighbouring base stations;

when the received base station identifier from the UE matches with the base station identifier of the base station, determining whether the received UE identifier and the RAT information match with an information in a UE context database of the base station;

determining the UE context information when the received UE identifier and the RAT information match with the information in the UE context database of the base station; and establishing a connection with the UE using the UE context information.

[10]: The computer readable medium described in [9], while determining the UE context information when the received UE identifier and the RAT information match with the information in the UE context database of the base station, the instructions cause the base station to perform operations comprising:

verifying whether the received authentication information from the UE matches with a UE authentication information computed at the base station;

when the received authentication information from the UE matches with the UE authentication information computed at the base station, determining the UE context information;

when the received authentication information from the UE does not match with the UE authentication information computed at the base station, transmitting at least one of the received base station identifier, the received UE identifier, the received authentication information, and the RAT information to the plurality of neighbouring base stations; and receiving the UE context information from one of the plurality of neighbouring base stations.

[11]: The computer readable medium described in any of [9] to [10], wherein the UE context information comprises a UE context related to the connection of the UE with the base station or one of the plurality of neighbouring base stations.

[12]: The computer readable medium described in any of [9] to [11], wherein the resume request is received with one of a full resume identity or a truncated resume identity.

With respect to the use of substantially any plural and singular terms herein, those having skill in the art can translate from the plural to the singular and from the singular to the plural as is appropriate to the context or application. The various singular/plural permutations may be expressly set forth herein for sake of clarity.

One or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" is understood to include tangible items and exclude carrier waves and transient signals, i.e., be non-transitory. Examples include RAM, ROM, volatile memory, non-volatile memory, hard drives, CD ROMs, DVDs, flash drives, disks, and any other known physical storage media.

The described operations may be implemented as a method, system or article of manufacture using standard programming and engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, PGA, ASIC, etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device or article (whether or not they cooperate) may be used in place of a single device or article. Similarly, where more than one device or article is described herein (whether or not they cooperate), it will be readily apparent that a single device or article may be used in place of the more than one device or article or a different number of devices or articles may be used instead of the shown number of devices or programs. At least one of the functionality and the features of a device may be alternatively embodied by one or more other devices which are not explicitly described as having such functionality or features. Thus, other embodiments of the disclosure do not include the device itself.

The illustrated operations of FIG. 3 show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERRAL NUMERALS

| Reference number | Description |
| --- | --- |
| 101 | UE |
| 103 | Base station |
| 105 | Neighbouring base station |
| 107 | MME |
| 201 | I-O interface |
| 203 | Processor |
| 205 | Memory |
| 207 | Data |
| 209 | Resume request data |
| 211 | Base station identifier data |
| 213 | RAT data |
| 215 | UE authentication data |
| 217 | UE context data |
| 219 | Other data |
| 231 | Modules |
| 233 | Transceiver module |
| 235 | Retrieving module |
| 237 | Determining module |
| 239 | Verifying module |
| 241 | Other modules |

The invention claimed is:

1. A base station, the base station configured to:
receive a resume request from a UE, wherein the resume request comprises a base station identifier, a UE identifier, and authentication information;
retrieve a Radio Access Technology (RAT) information of the UE from a lower layer of the base station upon receiving the resume request;
determine whether the received base station identifier from the UE matches with the base station identifier of the base station;
when the received base station identifier from the UE does not match with the base station identifier of the base station,
transmit at least one of the received base station identifier, the received UE identifier, the received authentication information, and the RAT information to a plurality of neighbouring base stations;
receive a UE context information from one of the plurality of neighbouring base stations;
when the received base station identifier from the UE matches with the base station identifier of the base station,
determine whether the received UE identifier and the RAT information match with an information in a UE context database of the base station;
determine the UE context information when the received UE identifier and the RAT information match with the information in the UE context database of the base station; and
establish a connection with the UE using the UE context information.

2. The base station as claimed in claim 1, while determining the UE context information when the received UE identifier and the RAT information match with the information in the UE context database of the base station, the base station is configured to:
verify whether the received authentication information from the UE matches with a UE authentication information computed at the base station;

when the received authentication information from the UE matches with the UE authentication information computed at the base station, determine the UE context information;
when the received authentication information from the UE does not match with the UE authentication information computed at the base station,
transmit at least one of the received base station identifier, the received UE identifier, the received authentication information, and the RAT information to the plurality of neighbouring base stations; and
receive the UE context information from one of the plurality of neighbouring base stations.

3. The base station as claimed in claim 1, wherein the UE context information comprises a UE context related to the connection of the UE with the base station or one of the plurality of neighbouring base stations.

4. The base station as claimed in claim 1, wherein the resume request is received with one of a full resume identity or a truncated resume identity.

5. A method comprising:
receiving a resume request from a UE, wherein the resume request comprises a base station identifier, a UE identifier, and authentication information;
retrieving a Radio Access Technology (RAT) information of the UE from a lower layer of a base station upon receiving the resume request;
determining whether the received base station identifier from the UE matches with the base station identifier of the base station;
when the received base station identifier from the UE does not match with the base station identifier of the base station,
transmitting at least one of the received base station identifier, the received UE identifier, the received authentication information, and the RAT information to a plurality of neighbouring base stations;
receiving a UE context information from one of the plurality of neighbouring base stations;
when the received base station identifier from the UE matches with the base station identifier of the base station,
determining whether the received UE identifier and the RAT information match with an information in a UE context database of the base station;
determining the UE context information when the received UE identifier and the RAT information match with the information in the UE context database of the base station; and
establishing a connection with the UE using the UE context information.

6. The method as claimed in claim 5, while determining the UE context information when the received UE identifier and the RAT information match with the information in the UE context database of the base station, the method comprising:
verifying whether the received authentication information from the UE matches with a UE authentication information computed at the base station;
when the received authentication information from the UE matches with the UE authentication information computed at the base station, determining the UE context information;
when the received authentication information from the UE does not match with the UE authentication information computed at the base station, transmitting at least one of the received base station identifier, the received UE identifier, the received authentication information, and the RAT information to the plurality of neighbouring base stations; and receiving the UE context information from one of the plurality of neighbouring base stations.

7. The method as claimed in claim 5, wherein the UE context information comprises a UE context related to the connection of the UE with the base station or one of the plurality of neighbouring base stations.

8. The method as claimed in claim 5, wherein the resume request is received with one of a full resume identity or a truncated resume identity.

9. A non-transitory computer readable medium including instructions stored thereon that when processed by at least one processor cause a base station to perform operations comprising:

receiving a resume request from a UE, wherein the resume request comprises a base station identifier, a UE identifier, and authentication information;

retrieving a Radio Access Technology (RAT) information of the UE from a lower layer of a base station upon receiving the resume request;

determining whether the received base station identifier from the UE matches with the base station identifier of the base station;

when the received base station identifier from the UE does not match with the base station identifier of the base station, transmitting at least one of the received base station identifier, the received UE identifier, the received authentication information, and the RAT information to a plurality of neighbouring base stations;

receiving a UE context information from one of the plurality of neighbouring base stations;

when the received base station identifier from the UE matches with the base station identifier of the base station, determining whether the received UE identifier and the RAT information match with an information in a UE context database of the base station;

determining the UE context information when the received UE identifier and the RAT information match with the information in the UE context database of the base station; and establishing a connection with the UE using the UE context information.

10. The computer readable medium as claimed in claim 9, while determining the UE context information when the received UE identifier and the RAT information match with the information in the UE context database of the base station, the instructions cause the base station to perform operations comprising:

verifying whether the received authentication information from the UE matches with a UE authentication information computed at the base station;

when the received authentication information from the UE matches with the UE authentication information computed at the base station, determining the UE context information;

when the received authentication information from the UE does not match with the UE authentication information computed at the base station, transmitting at least one of the received base station identifier, the received UE identifier, the received authentication information, and the RAT information to the plurality of neighbouring base stations; and receiving the UE context information from one of the plurality of neighbouring base stations.

11. The computer readable medium as claimed in claim 9, wherein the UE context information comprises a UE context related to the connection of the UE with the base station or one of the plurality of neighbouring base stations.

12. The computer readable medium as claimed in claim 9, wherein the resume request is received with one of a full resume identity or a truncated resume identity.

* * * * *